United States Patent

[11] 3,615,264

| [72] | Inventors | James W. Berry;<br>Archie J. Deutschman, Jr., both of Tucson, Ariz. |
|---|---|---|
| [21] | Appl. No. | 692,267 |
| [22] | Filed | Dec. 21, 1967 |
| [45] | Patented | Oct. 26, 1971 |
| [73] | Assignee | Owens-Illinois, Inc. |

[54] HYDROTHERMAL METHOD OF GROWING ZINC OXIDE CRYSTALS
13 Claims, No Drawings

[52] U.S. Cl.................................................. 23/301 R,
        23/186, 252/387, 23/305, 203/7
[51] Int. Cl.............................................. C01g 9/02
[50] Field of Search........................................... 23/300,
        301, 304, 186; 252/387

[56] References Cited
UNITED STATES PATENTS

| 2,332,209 | 10/1943 | Enquist........................ | 252/387 |
| 2,635,999 | 4/1953 | Rohrback...................... | 252/387 |
| 3,201,209 | 9/1965 | Caporaso et al.............. | 23/300 |

*Primary Examiner*—Norman Yudkoff
*Assistant Examiner*—S. Silverberg
*Attorneys*—Howard G. Bruss, Jr. and W. A. Schaich ABSTRACT: A method for inhibiting corrosion of the reaction vessel during the hydrothermal growth of zinc oxide crystals in an alkaline solution of KOH wherein the solution contains potassium phosphate as the corrosion inhibitor.

HYDROTHERMAL METHOD OF GROWING ZINC OXIDE CRYSTALS

Crystalline zinc oxide (zincite) is presently in great demand in the electronic and related industries because of its unique properties. For instance, zinc oxide strongly piezoelectric with a coupling factor greater than four times that of quartz. Zinc oxide also has a very low dielectric constant making it suitable for such devices as transducers. Zinc oxide crystals are also useful in acoustical amplifiers, delay lines and other electrical devices.

In view of this increased demand, there exists a need for improved methods of producing high-quality zincite. Crystalline zinc oxide is currently produced by various techniques including the hydrothermal growth from a basic or alkaline nutrient medium.

"Hydrothermal" is an art-recognized term and refers to a system wherein water is maintained at elevated temperatures. The phrase "hydrothermal" crystal growth" refers to a process wherein a nutrient medium (such as zinc oxide) is dissolved in an aqueous solution at elevated temperatures in one section of the system and deposited from the solution in another section of the system and deposited from the solution in another section of the system as the pure crystalline species (i.e. zincite). This process is usually carried out in a sealed vertical pressure vessel or autoclave with a temperature differential between the top and the bottom of the vessel. Under these conditions, the zinc oxide nutrient is dissolved in the aqueous solution in the lower section of the autoclave where the temperature is higher. The aqueous solution circulates within the autoclave under the convection currents established by the temperature gradient. When the circulating aqueous solution reaches the upper section of the chamber, where the temperature is slightly lower, it becomes supersaturated with respect to the zinc oxide. Accordingly, the zinc oxide then crystallizes out of solution and is deposited as the pure crystallized material (zincite). This process is referred to as spontaneous nucleation and growth. The depleted solution then returns to the lower section of the chamber to be reheated and dissolve more of the zinc oxide nutrient.

To facilitate uniform crystal growth a seed of the desired crystalline material (zincite) can be positioned in the upper section of the chamber. This seed acts as a nucleation center for the deposition and growth of zinc oxide from the aqueous solution as it circulates within the autoclave.

Under present practice zincite crystals are hydrothermally grown at reasonable rates using a zinc oxide nutrient in contact with the alkaline aqueous medium at extremely high temperatures and pressures in a vertical cylindrical autoclave. The nutrient is placed in the lower portion of the autoclave and the pure zincite seed crystals have been suspended above the nutrient. The temperature gradient is maintained by heating the autoclave at the bottom and allowing the heat to be radiated at a controlled rate from the upper portion of the autoclave. Under this thermal gradient a natural convection current is established in the aqueous medium. Usually a baffle is placed between the nutrient and the seed to control circulation thereby insuring the existence of a thermal gradient within the aqueous medium.

While the process is satisfactory in many respects, severe processing problems often arise as a result of the corrosive nature of the aqueous alkaline transport medium at the high temperatures. In fact, the hydrothermal growth of single crystals of zinc oxide at high temperatures and pressures has not been realized except under special conditions, because the alkaline growth medium (aqueous potassium hydroxide) has an unusually corrosive action on the alloy steels and other ferrous metals and alloys from which high-pressure autoclaves are constructed. Although noble metal liners have been employed to circumvent this corrosive action, such devices are commercially inexpedient because of the poor physical properties. Additionally, noble metals are quite expensive. Additionally, these liners can result in operational difficulties in that autoclave sealing is often a problem.

Another approach to preventing autoclave corrosion has been the incorporation of corrosion-inhibiting materials into the hydrothermal system. This approach has been unsatisfactory in that corrosion-inhibiting materials often interfere with the deposition and growth of the pure zincite crystals.

Accordingly, it is an object of the present invention to provide a method of growing crystalline zinc oxide from a hydrothermal solution in which the corrosion problem is materially reduced.

Another object is to provide a method of growing zincite crystals in an aqueous alkaline medium at elevated temperatures and pressures in an ordinary high-strength autoclave.

A still further object of the present invention is to provide a method of growing zinc oxide crystals from an alkaline hydrothermal solution wherein a compound is included which inhibits without substantially detracting from the purity of the crystallized zincite.

The above and other objects, features and advantages of the present invention will become apparent to those skilled in the art from the following description and claims.

According to the present invention, a growth medium capable of producing high-quality single crystals of zinc oxide is provided which is less corrosive to the high-strength ferrous alloy steels used in autoclave construction. The growth medium comprises an aqueous solution of tripotassium orthophosphate and potassium hydroxide. The pH of the solution is maintained at the high level necessary for solution of zinc oxide, the corrosive action of the medium is decreased, and practical, efficient hydrothermal growth of pure zinc oxide single crystals is realized.

The present invention is conveniently carried out in any high-pressure, high-temperature autoclave. The apparatus used in the following examples was a tubular microvessel reactor constructed on No. 316 stainless steel tubing having a length of 6 inches, an outside diameter of 9/16 inch, an inside diameter of 3/16 inch and a pressure rating of 60,000 p.s.i.g. The two reactor ends were each equipped with a collar, nut and cap assembly producing a metal against metal seal. The capacity of the vessel was 3.5 ml.

In practicing the present invention the autoclave is charged with nutrient zinc oxide particles. The particle size is not considered to be critical although it is known that the particle size often controls the crystal growth rate. For instance, if the particle size is quite small, the particles will have a tendency to pack tightly in the autoclave and restrict circulation and dissolution of the nutrient. As the zinc oxide size is increased, circulation through dissolution in the nutrient is easier. However, if the zinc oxide particle size is too large (i.e. lumps one-fourth to one-half inch in diameter) the dissolution rate of the nutrient is low because of the low surface area exposed.

After charging the zinc oxide nutrient, the autoclave is charged with the aqueous hydrothermal solution.

The aqueous hydrothermal solution charged to the autoclave in practicing the present invention consists essentially of:

| Component | Range—% by Weight | | |
|---|---|---|---|
| | Broad | Preferred | Especially Preferred |
| Tripotassium orthophosphate ($K_3PO_4$) | 1–35 | 1–5 | about 2 |
| Potassium Hydroxide (KOH) | 1–35 | 5–15 | about 10 |
| Water ($H_2O$) | 30–98 | 80–94 | about 88 |

The concentration of tripotassium orthophosphate is critical in that if the concentration is too low, the corrosive action of alkaline solution at the extreme temperature is not effectively inhibited. On the other hand, when the concentration of tripotassium orthophosphate is too high, the nucleation and growth of the pure crystalline zinc oxide is restricted. The lower concentration of $K_3PO_4$ and KOH are preferred from an operational standpoint, since the possibility of random, uncontrolled crystallization is lessened at lower solution concentrations.

It will be understood that the composition of the hydrothermal solution changes slightly due to the dissolution of zinc oxide when hydrothermal equilibrium conditions have been established. This will be discussed below.

To obtain a practical rate of growth, it is necessary to charge the autoclave at room temperature to at least about 50 percent of its total volume. As the degree of fill increases, the growth rate usually increases. It is often convenient to operate in the range of 70 to 90 percent of autoclave capacity (when measured at room temperature).

After the autoclave has been charged with the zinc oxide nutrient and the hydrothermal solution, the system is brought slowly to operating conditions. This heating-up cycle often takes several hours since best results are achieved by heating the autoclave to operating conditions with small incremental increases in temperature and establishing the desired operating thermal gradient at or near operating temperature.

As used above, the term "operating thermal gradient" refers to the temperature differential between the nutrient zinc oxide dissolving region (high temperature) and the region of crystalline nucleation and growth of the pure zinc oxide (lower temperature) with the growth rate increasing as the temperature differential increases. It is not required that the autoclave be situated in the vertical position so long as convection currents are established in the hydrothermal solution. In the following examples the reactor position was both horizontal and vertical as indicated in each example. Suitable growth rates and good quality crystals are achieved with operating thermal gradients in the range of about 5 to 100° C. Usually good results are obtained with thermal gradients in the range of 5 to 25° C.

The thermal gradient is established with respect to the temperature of the growth region which region is maintained in the range of 375 to 425° C. At temperatures below 375° C. crystal growth becomes impractical, while at higher temperatures (e.g., above 425° C.) corrosion rates increase and strength of metals decreases. Additionally, it has been found that reasonable growth rates can be achieved at temperatures of about 400° C.

The hydrostatic pressure in the autoclave is, of course, determined by the degree of fill and temperature, and can vary from 1,000 p.s.i.g. or less to 20,000 p.s.i.g. or more. The upper operating pressure limit is determined by the autoclave capability while the lower pressure limit coincides approximately with the critical pressure of the "growth solution" within the autoclave which should be slightly exceeded.

The "growth solution" within the autoclave comprises the hydrothermal solution described above plus the amount of dissolved zinc oxide at the operating temperature. The exact solubility of zinc oxide in the hydrothermal solution is not known. The amount of zinc oxide charged to the autoclave is in the range of 0.05 to 0.3 gram ZnO/gram hydrothermal solution.

The crystal growth time period employed depends upon the size of the crystal desired. In ordinary applications, this time period can be up to 15 days or longer The growth of crystalline zincite according to the present invention is illustrated in the following examples.

In the examples the zinc oxide nutrient was 99.1 percent pure, and in powder form.

The tripotassium orthophosphate was prepared by the neutralization reaction between $H_3PO_4$ and KOH. The $H_3PO_4$ was 85 percent acid as the analytical grade. KOH was also analytical grade as 85 percent base in the pellet form.

EXAMPLE 1

The microautoclave described above was charged with 1.0 gram of zinc oxide nutrient and 2.45 grams of a hydrothermal solution consisting of 33 percent by weight KOH and 33 percent $K_3PO_4$ with the balance being water. The autoclave was then sealed, placed in the horizontal position and placed in an oven at a temperature of 400° C.

After seven days, the reactor was removed from the oven, opened and a hexagonal crystal weighing about 0.2 grams was present. This crystal was identified as homogeneous, high-purity zinc oxide (zincite) by X-ray diffraction.

The autoclave employed showed no evidence of corrosion.

EXAMPLES 2 to 4

The equipment and procedures of example 1 were employed in these examples except that the experimental conditions were as indicated in the following table. In these examples, the pressure was the autogenous pressure corresponding to the equilibrium conditions and was not directly measured. The pressure was estimated to be between 1,000 and 20,000 p.s.i.g.; and probably between 5,000 and 10,000 p.s.i.g. The concentration of KOH and $K_2PO_4$ in the hydrothermal solution is reported in the table; the balance is water.

TABLE I
Summary of Exemplary Results

| | ZnO nutrient gm./gm. hydrothermal solution | Hydrothermal solution composition | | Percent fill of reactor vol. (at room temp.) | Temp. (° C.) | Time (days) | Yield (gm. of zincite) |
|---|---|---|---|---|---|---|---|
| | | KOH, percent | $K_3PO_4$, percent | | | | |
| Example: | | | | | | | |
| 2 | 0.28 | 30.9 | 30.9 | 80 | 400 | 14 | 0.1-0.2 |
| 3 | 0.1 | 10 | 2 | 50 | 404 | 6 | 0.1-0.2 |
| 4 | 0.1 | 10 | 10 | 50 | 375 | 8 | 0.1-0.2 |

In each example, high-quality and high-purity zincite crystals were obtained while no evidence of autoclave corrosion was observed upon careful inspection.

From the foregoing, it is apparent that the present invention provides a novel method of inhibiting corrosion of the reaction vessel during the hydrothermal growth of crystalline zinc oxide.

Having described the invention, what is claimed is:

1. In the method of hydrothermally growing zinc oxide crystals at elevated temperatures in the range of about 375 to 475° C. and elevated pressures, in an alkaline solution in a ferrous metal pressure vessel, wherein nutrient zinc oxide is dissolved in one region of the vessel and crystallized as pure zincite in another section, the improvement which comprises inhibiting the corrosion of the metal pressure vessel without substantially detracting from the purity of the crystallized zincite by growing said zinc oxide crystals in an alkaline solution consisting essentially of:

| Component | % by Weight |
|---|---|
| Tripotassium orthophosphate | 1-35 |
| Potassium hydroxide | 1-35 |
| Water | 30-98 |

2. The method of claim 1 wherein said elevated pressures are from about 1,000 p.s.i.g. to 20,000 p.s.i.g.

3. The method of claim 2 wherein the amount of said nutrient zinc oxide is in the range of about 0.05 to 0.3 grams zinc oxide per gram of said alkaline solution.

4. The method of claim 3 wherein said alkaline solution consists essentially of:

| Component | % by Weight |
| --- | --- |
| Tripotassium orthophosphate | 1-5 |
| Potassium hydroxide | 5-15 |
| Water | 80-94 |

5. The method of claim 3 wherein said alkaline solution consists essentially of:

| Component | % by Weight |
| --- | --- |
| Tripotassium orthophosphate | about 2% |
| Potassium hydroxide | about 10% |
| Water | about 88% |

6. In the method of hydrothermally growing high-purity crystalline zinc oxide in a ferrous metal pressure vessel, at elevated temperatures in the range of about 375 to 425 °C. and elevated pressures, wherein nutrient zinc oxide is systematically dissolved in, and crystallized from, an aqueous alkaline solution of potassium hydroxide,
the improvement of which comprises incorporating tripotassium orthophosphate into said solution to substantially reduce the corrosive action of the alkaline solution on the pressure vessel without interfering with the deposition and growth of pure zincite crystals.

7. The method of claim 6 wherein the amount of tripotassium orthophosphate incorporated into said aqueous alkaline solution is sufficient to yield a solution composition in the range of

| Component | % by Weight |
| --- | --- |
| Tripotassium orthophosphate | 1-35 |
| Potassium hydroxide | 1-35 |
| Water | 30-98 |

8. The method of claim 7 wherein said elevated pressures are from about 1,000 p.s.i.g. to 20,000 p.s.i.g.

9. The method of claim 8 wherein the amount of said nutrient zinc oxide is in the range of about 0.05 to 0.3 grams zinc oxide per gram of said alkaline solution.

10. The method of claim 9 wherein said solution composition comprises

| Component | % by Weight |
| --- | --- |
| Tripotassium orthophosphate | about 33 |
| Potassium hydroxide | about 33 | and said elevated temperature is about 400° C.

11. The method of claim 9 wherein said solution composition comprises

| Component | % by Weight |
| --- | --- |
| Tripotassium orthophosphate | about 31 |
| Potassium hydroxide | about 31 | and said elevated temperature is about 400° C.

12. The method of claim 9 wherein said solution composition comprises

| Component | % by Weight |
| --- | --- |
| Tripotassium orthophosphate | about 10 |
| Potassium hydroxide | about 2 | and said elevated temperature is about 400° C.

13. The method of claim 9 wherein said solution composition comprises

| Component | % by Weight |
| --- | --- |
| Tripotassium orthophosphate | about 10 |
| Potassium hydroxide | about 10 | and said elevated temperature is about 375° C.